(12) United States Patent
Trott

(10) Patent No.: US 8,046,656 B2
(45) Date of Patent: Oct. 25, 2011

(54) RENDERING AND CORRECTING DATA

(75) Inventor: Mitchell Trott, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1011 days.

(21) Appl. No.: 11/591,346

(22) Filed: Oct. 31, 2006

(65) Prior Publication Data

US 2008/0104473 A1 May 1, 2008

(51) Int. Cl.
*H04L 1/00* (2006.01)
*H04B 14/00* (2006.01)
(52) U.S. Cl. .......................... 714/747; 375/240
(58) Field of Classification Search .......... 714/746–748; 375/240
See application file for complete search history.

(56) References Cited

U.S. PATENT DOCUMENTS

| | | | |
|---|---|---|---|
| 6,085,252 A | 7/2000 | Zhu | |
| 6,104,757 A * | 8/2000 | Rhee | 375/240.12 |
| 6,289,054 B1 | 9/2001 | Rhee | |
| 6,463,522 B1 * | 10/2002 | Akkary | 712/216 |
| 6,937,709 B2 * | 8/2005 | Bei et al. | 379/100.01 |
| 7,296,192 B2 * | 11/2007 | Breitling et al. | 714/49 |
| 7,296,204 B2 * | 11/2007 | Merritt | 714/748 |
| 7,516,393 B2 * | 4/2009 | Hepner et al. | 714/776 |
| 2002/0181506 A1 | 12/2002 | Loguinov | |
| 2003/0206549 A1 * | 11/2003 | Mody et al. | 370/390 |
| 2005/0180415 A1 * | 8/2005 | Cheung et al. | 370/389 |
| 2006/0007943 A1 * | 1/2006 | Fellman | 370/400 |
| 2007/0022361 A1 * | 1/2007 | Bauer et al. | 714/776 |
| 2007/0162169 A1 * | 7/2007 | Watanuki | 700/94 |

FOREIGN PATENT DOCUMENTS

JP 2002247578 A * 8/2002

OTHER PUBLICATIONS

"A digital fountain approach to asynchronous reliable multicast" by Byers et al. This paper appears in: Selected Areas in Communications, IEEE Journal on Publication Date: Oct. 2002 vol. 20, Issue: 8 on pp. 1528-1540 ISSN: 0733-8716 INSPEC Accession No. 7414457.*
"An efficient loss recovery scheme for on-demand video streaming over the internet" by Hayasaka et al. This paper appears in: Advanced Communication Technology, 2005, ICACT 2005. The 7th International Conference on Publication Date: 2005 vol. 2, on pp. 1301-1306 INSPEC Accession No. 8471512.*
Baek, J.; Paris, J.-F.; , "A buffer management scheme for tree-based reliable multicast using infrequent acknowledgments," Performance, Computing, and Communications, 2004 IEEE International Conference on , vol., No., pp. 13-20, 2004 doi: 10.1109/PCCC.2004. 1394932 URL: http://ieeexplore.ieee.org/stamp/stamp.jsp?tp=&arnumber=1394932&isnumber=28907.*
Jenkac, et al. "Asynchronous and Reliable On-Demand Media Broadcast" IEEE Network, Mar./Apr. 2006, pp. 14-20.
Han, et al. "A Progressively Reliable Transport Protocol for Interactive Wireless Multimedia" Multimedia Systems 7, 1999, pp. 141-156.

* cited by examiner

*Primary Examiner* — Cynthia Britt

(57) ABSTRACT

Rendering and correcting data. Data is received. The data is stored at a memory. The data is rendered for presentation at an output device. Defects in the data stored at the memory are determined. The defects in the data stored at the memory are corrected, wherein at least a portion of the correction of the defects is performed after transmitting the data.

15 Claims, 4 Drawing Sheets

RENDERING AND CORRECTING DATA

FIELD

The present invention relates to the field of data storage.

BACKGROUND ART

There are circumstances where a user might want to watch and store voice, video, or other streaming media communication. For example, participants in a phone conversation or videoconference may wish to preserve the meeting for future use. An example in one-way communication is when a user who purchased access to a sporting event delivered over the Internet, wishes to watch the event in real time and also save it for later sharing or reviewing.

Systems designed for low latency consumption and viewing of media often achieve low latency at the expense of reliability. Depending on network conditions, or wireless impairments, or other system-dependent fluctuations, data may be lost or corrupted, and there may be insufficient time or mechanism to repair the data before it must be presented or consumed by the end user. Lost or corrupted data is perceived by the user as some kind of disruption in the media session, for example, silence or distortion in audio or video artifacts in a video session. These impairments, while undesirable, are often considered to be an acceptable tradeoff in exchange for receiving data with low latency.

A current technique for presenting and storing data simply records the data as it is presented to a user, including all disruptions caused by lost or corrupted data. While disruptions are often accepted in low latency applications, if the streaming data is to be stored these artifacts may be highly undesirable. For example, if the user pays for the media stream, they may be highly dissatisfied with anything short of a clean copy. If the user uploads media to the server for relaying and storage, the user may not even be aware that the stored version is damaged, and (much to their regret) may discover the damage only much later when reviewing the archive.

Another current technique for presenting and storing data provides for the transmission of two copies of the data. This technique is very wasteful of bandwidth. For example, if bandwidth is particularly scarce such as in a wireless network, it might require the receiver to remain active on the network for a long period of time after the session has ended, so that the second version of the data may be transmitted. Moreover, where the receiver is a wireless device, the additional time required to receive the second version consumes additional battery power and requires a user to stay within range of the wireless network until the second version is received.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DESCRIPTION OF EMBODIMENTS

Various embodiments of the present invention, a method for rendering and correcting data, are described herein. In one embodiment, data is received. The data is stored at a memory. The data is transmitted for rendering at an output device. Defects in the data stored at the memory are determined. The defects in the data stored at the memory are corrected, wherein at least a portion of the correction of the defects is performed after the data is transmitted.

Reference will now be made in detail to the various embodiments of the invention, examples of which are illustrated in the accompanying drawings. While embodiments of the invention will be described in conjunction with the various embodiments, it will be understood that they are not intended to limit the invention to these embodiments. On the contrary, embodiments of the invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

Various embodiments of the present invention, rendering and correcting data, are described herein. Embodiments of the present invention provide a method and device thereof for rendering low latency data and correcting and storing the low latency data. Embodiments of the present invention provide for correcting the data without requiring retransmission of all data. In various embodiments of the present invention, defects in the data are determined, and repair data associated with the defects is requested. The repair data is used to correct the defects in the data.

Figure 1:
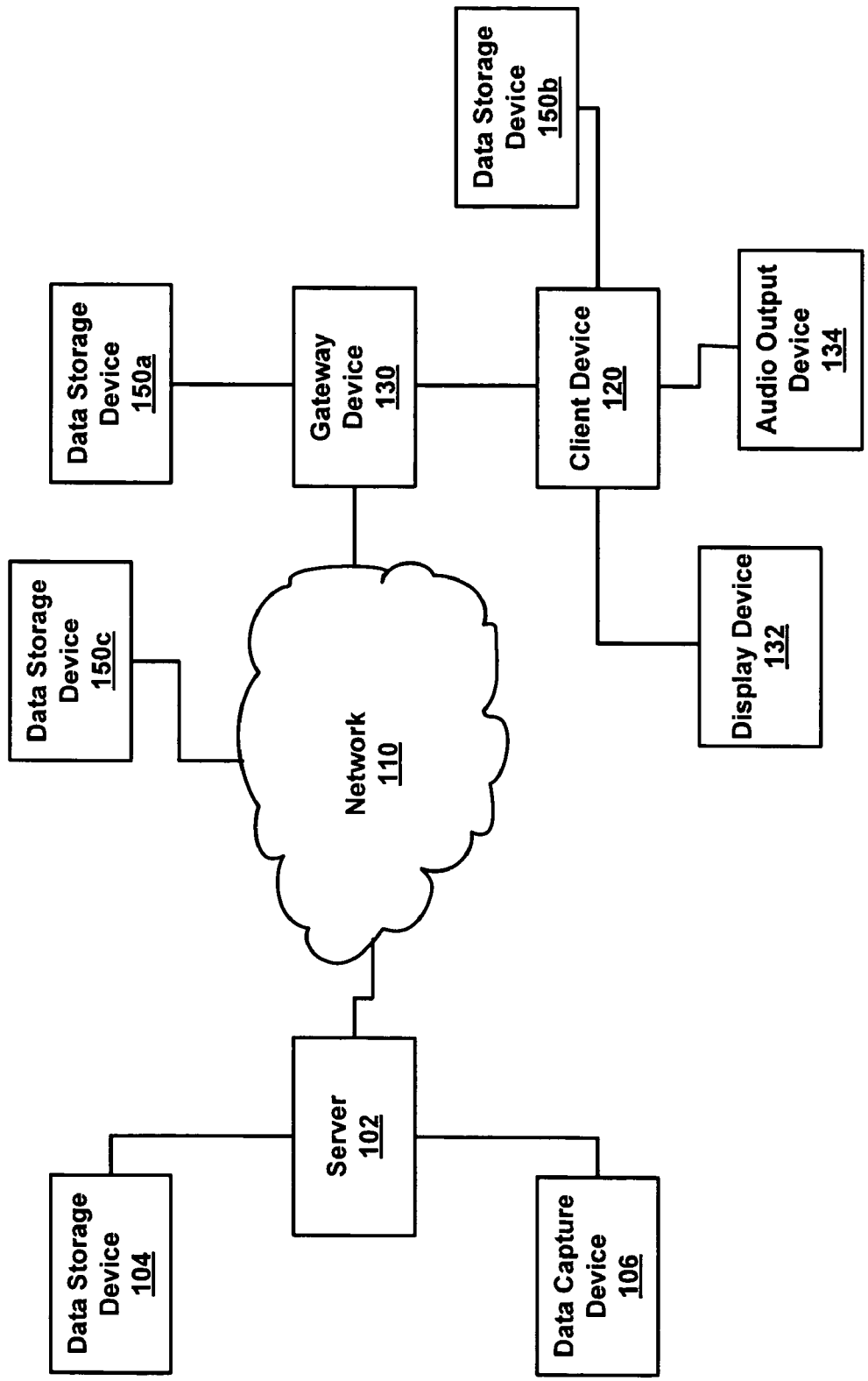
FIG. 1 is a block diagram illustrating an example distributed network, in accordance with an embodiment of the present invention.

FIG. 1 is a block diagram illustrating an example distributed network 100, in accordance with an embodiment of the present invention. Distributed network 100 includes server 102 communicatively coupled to client device 120 over network 110. In one embodiment, server 102 is operable to transmit loss tolerant data, such as audio and/or video data, to client device 120 at a low latency. By providing low latency, the data is delivered to client device 120 with little delay that is unnoticeable to a user of client device 120. Moreover, a corrected version of the data that may include portions received at a higher latency is stored, e.g., at one of storage devices 150a, 150b and 150c. For example, the stored version can be used for later rendering, processing or archiving.

In one embodiment, server 102 provides a packetizing network interface for transmitting data to client device 120. It should be appreciated that server 102 is operable to provide many different types of data, such as streaming media data, e.g., audio and/or video media. For instance, in one embodiment server 102 is communicatively coupled to data storage 104 for streaming pre-recorded media data to client device 120. In one embodiment, server 102 is communicatively coupled to media capture device 106 for streaming substantially live media to client device 120. Substantially live media refers to media that would be rendered for live viewing, subject to network latencies in streaming data to client device 120.

Embodiments of the present invention provide one-way low latency communication. For example, a user viewing a live event, such as a sporting event or a news feed. Embodiments of the present invention are also provide two-way low latency communication, such as videoconferencing. It should be appreciated that distributed network 100 may include additional components, e.g., client devices, output devices, and storage devices, for providing low latency data rendering and higher latency data correction and storage to any number of participants in one-way or two-way communication. These additional components operate in a similar manner as the described embodiments, and are not shown in FIG. 1 so as to not unnecessarily obscure aspects of the embodiments of the present invention.

Server 102 is communicatively coupled to and transmits data over network 110. In one embodiment, network 110 is a low latency network, such as a wireless network. In one embodiment, network 110 is a best effort network, e.g., does not monitor to guarantee that data has been received or that lost or damaged data is recovered. In one embodiment, server 102 transmits data using Real-time Transport Protocol (RTP) packets inside User Datagram Protocol (UDP) packets, e.g., a UDP packet with an RTP payload. RTP provides sequence numbering and time stamping for timely delivery of audio and video media. It should be appreciated that server 102 can communicate packets using other protocols, including but not limited to, Secure RTP (SRTP) Transmission Control Protocol (TCP)/Internet Protocol (IP), and other protocols, and that the described embodiments are examples.

In general, data traversing a communication network, such as network 110, is subject to impairments caused by the communication network. For example, data traversing a communication network is subject to packet loss, packet delay, or data corruption. To support low latency applications, these impairments are generally ignored such that a client device receives and presents continuous streaming media. As described above, a best effort network does not provide recovery of lost data, thereby reducing network overhead for providing low latency communication. It should be appreciated that the source or receiver, e.g., client device 120 or gateway device 130, may also be responsible for damage to the data. For example, if the source or receiver gets overloaded, they may drop packets.

In one embodiment, the destination of the data is client device 120. In one embodiment, the data is transmitted through a gateway device 130. It should be appreciated that there can be any number of intervening devices between network 110 and client device 120 over which the data can be transmitted. In one embodiment, client device 120 is coupled directly to network 110.

Figure 2:
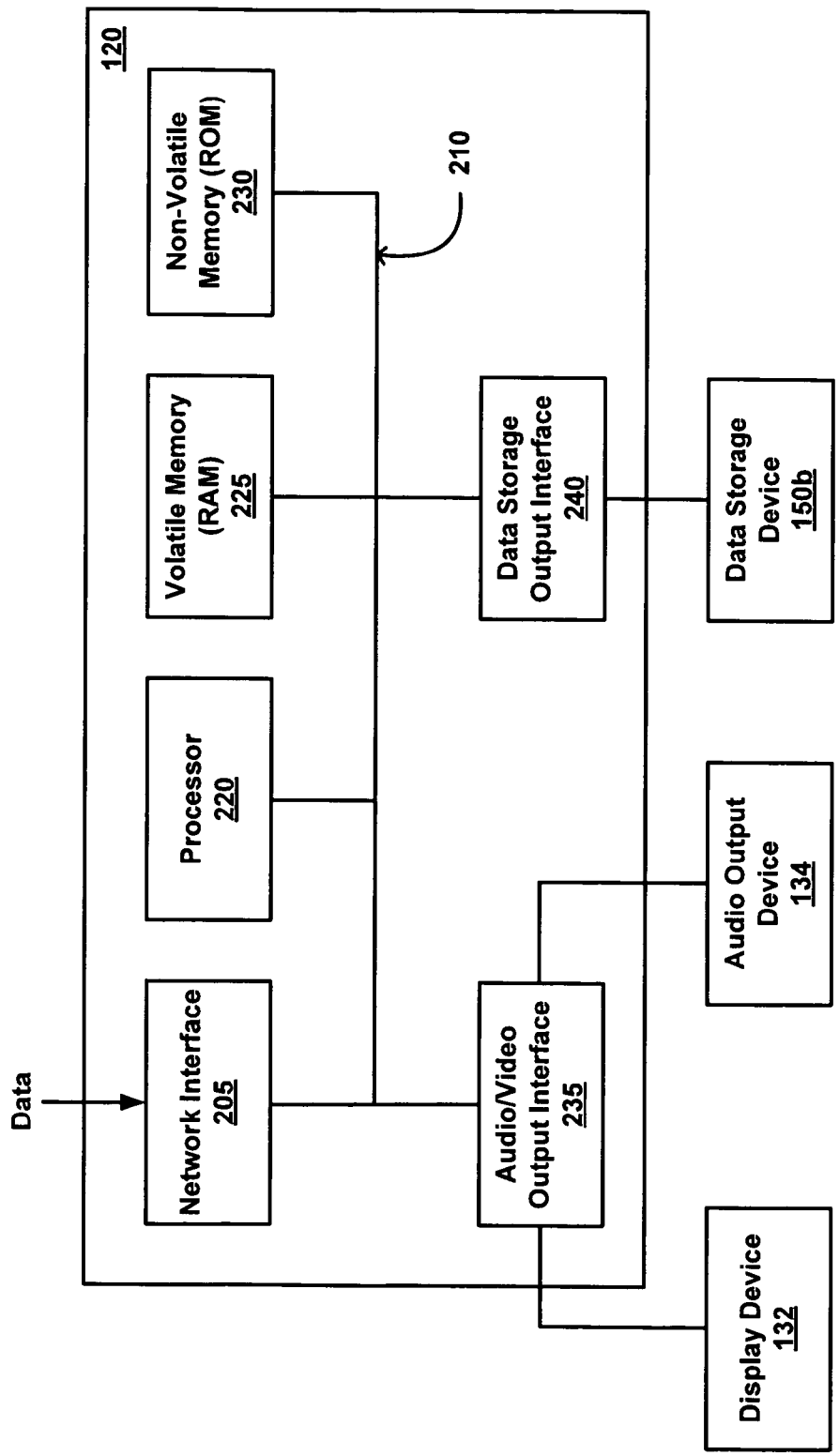
FIG. 2 is a block diagram illustrating a client device, in accordance with an embodiment of the present invention.

FIG. 2 is a block diagram illustrating a client device 120, in accordance with an embodiment of the present invention. Client device 120 includes network interface 205, processor 220, volatile memory 225, non-volatile memory 230, audio/video (A/V) output interface 235, and data storage output interface 240 communicatively coupled over bus 210. It should be appreciated that bus 210 illustrates one example embodiment of the interconnections of the components of client device 120, and that different interconnections may be used. For example, the components can communicate over a single bus, can be communicatively coupled over separate connections, or any combination thereof. It should be appreciated that client device 120 may include additional components that are not shown so as to not unnecessarily obscure aspects of the embodiments of the present invention.

In one embodiment, network interface 205 is for receiving and transmitting data over a communication network, e.g., network 110 of FIG. 1. In one embodiment, network interface 205 includes or is communicatively coupled to a packet processor for depacketizing incoming data packets and packetizing outgoing data. In one embodiment, network interface 205 receives media data, such as audio data and/or video data. In one embodiment, network interface 205 is operable to receive data having different latencies.

Processor 220 is for processing information and instructions. In one embodiment, processor 220 is operable to execute a process for rendering and correcting data, e.g., process 400 of FIG. 4. Volatile memory 225, e.g., random access memory (RAM), is for storing information and instructions for processor 220. In one embodiment, data received over network interface 205 is stored in volatile memory 225 for processing by processor 220. Non-volatile memory 230, e.g., read-only memory (ROM), is for storing static information and instructions for processor 220. In one embodiment, non-volatile memory 230 has stored therein instructions for executing a process for rendering and correcting data, e.g., process 400 of FIG. 4. In one embodiment, non-volatile memory 230 is for storing the received data. In one embodiment, non-volatile memory 230 is for storing corrected data.

In one embodiment, processor 220 is for controlling the transmission of received data to an output device through audio/video output interface 235 for rendering. In one embodiment, low latency data is transmitted for rendering. The rendered media is subject to impairments and corruptions associated with low latency data. In one embodiment, the low latency data is transmitted to display device 132 for visual rendering for presentation to a user. It should be appreciated that display device 132 may be a liquid crystal device (LCD), cathode ray tube (CRT), or other display device suitable for creating graphic images and alphanumeric characters. In one embodiment, the low latency data is transmitted to audio output device 134 for audio rendering for presentation to a user. It should be appreciated that audio output device 134 may be a speaker, headphones, or other audio rendering device suitable for audibly presenting information.

It should be appreciated that the data need not be associated with rendering data for presentation for a user. For example, client device 120 may be an automated surveillance system, for performing motion detection with real-time alarms, and where client device stores corrected data of the video and audio. In another embodiment, client device 120 can also be a relay node that both stores and relays information.

Client device 120 is operable to transmit low latency data to an output device for rendering. Client device 120 is also operable to store data, e.g., for later rendering, processing or archiving. As described above, disruptions and impairments in low latency data caused by packet loss, packet delay, and/or data corruption, are typically considered to be an acceptable tradeoff in exchange for receiving data with low latency. While these disruptions are often accepted in low latency applications, if the streaming data is to be stored, however, these artifacts may be highly undesirable. Embodiments of the present invention provide for rendering data at a low latency and for correcting and storing the data.

In one embodiment, processor 220 is operable to determine defects in the data and is operable to correct the defects. In one embodiment, low latency data is received at network interface 205 and stored in volatile memory 225. Processor 220 controls the transmission of the data to A/V output interface 235 for rendering.

In one embodiment, processor 220 is also operable to determine defects within the data stored in non-volatile memory 225 and to take action for correcting the defects. In one embodiment, processor 220 identifies missing portions of the data. In one embodiment, processor 220 identifies damaged, e.g., corrupted, portions of the data. In one embodiment, processor 220 makes note of which portions of the data are likely to be damaged. For example, this can be done by checking for gaps in the sequence numbers of the received media, or by verifying error detection codes present in the received media.

In one embodiment, processor 220 is operable to request repair data from a source of the data, e.g., server 102 of FIG. 1, for correcting the defects. For example, where processor 220 identifies a missing portion of the data, processor 220 requests retransmission of the missing portion. In another example, where processor 220 identifies a damaged portion of the data, processor 220 requests retransmission of the damaged portion. In one embodiment, the request is transmitted through network interface 205 to the source, e.g., server 102, using Real-time Transport Control Protocol (RTCP). In another embodiment, the request is transmitted through network interface 205 to the source, e.g., server 102, using Secure RTCP (SRTCP). It should be appreciated that other protocols may be used for transmitting the request, and that the described embodiments are examples.

In one embodiment, at least a portion of the data is corrected after the data is transmitted to an output device for rendering. For example, to support low latency rendering, data transmitted for rendering may not be corrected for defects. After the data is transmitted for rendering, the data may remain in non-volatile memory 225 where processor 220 can control correction of the data. For instance, where processor 220 identifies a missing sequence number, processor 220 may request retransmission of the data associated with the missing sequence number before the received data is transmitted for rendering. However, the repair data including the data associated with the missing sequence number may not be received until after the data is transmitted for rendering. Processor 220 may then correct the data using the repair data. It should be appreciated that the corrected data including the repair data is available for higher latency rendering. In one embodiment, repair data includes parity information, if the original data is protected by an error correction code.

In one embodiment, the data is received at a first latency and the repair data is received at a second latency, wherein the first latency is lower than the second latency such that the data is for low latency rendering. The repair data is for correcting the data for storage.

In one embodiment, the corrected data is stored at an internal data storage device, e.g., non-volatile memory 230. In one embodiment, the corrected data is stored at an external data storage device, e.g., data storage device 150b. Processor 220 is operable to control the transmission of the corrected data to data storage device 150b through data storage output interface 240. In one embodiment, the corrected data is stored at an external data storage device connected over a network, e.g., data storage device 150a or data storage device 150c of FIG. 1. Processor 220 is operable to control the transmission of the corrected data to data storage device 150a or 150c through network interface 205.

With reference to FIG. 1, in one embodiment, the low latency destination of the data is client device 120. In one embodiment, the data is transmitted through a gateway device 130. In one embodiment, gateway device 130 is operable to forward low latency data to a client device, e.g., client device 120, for rendering. Gateway device 130 is also operable to store data for rendering by client device 120 or other client devices. As described above, disruptions and impairments in low latency data caused by packet loss, packet delay, and/or data corruption, are typically considered to be an acceptable tradeoff in exchange for receiving data with low latency, but are less desirable in high latency rendering. Embodiments of the present invention provide for rendering data at a low latency and for correcting and storing the data.

Figure 3:
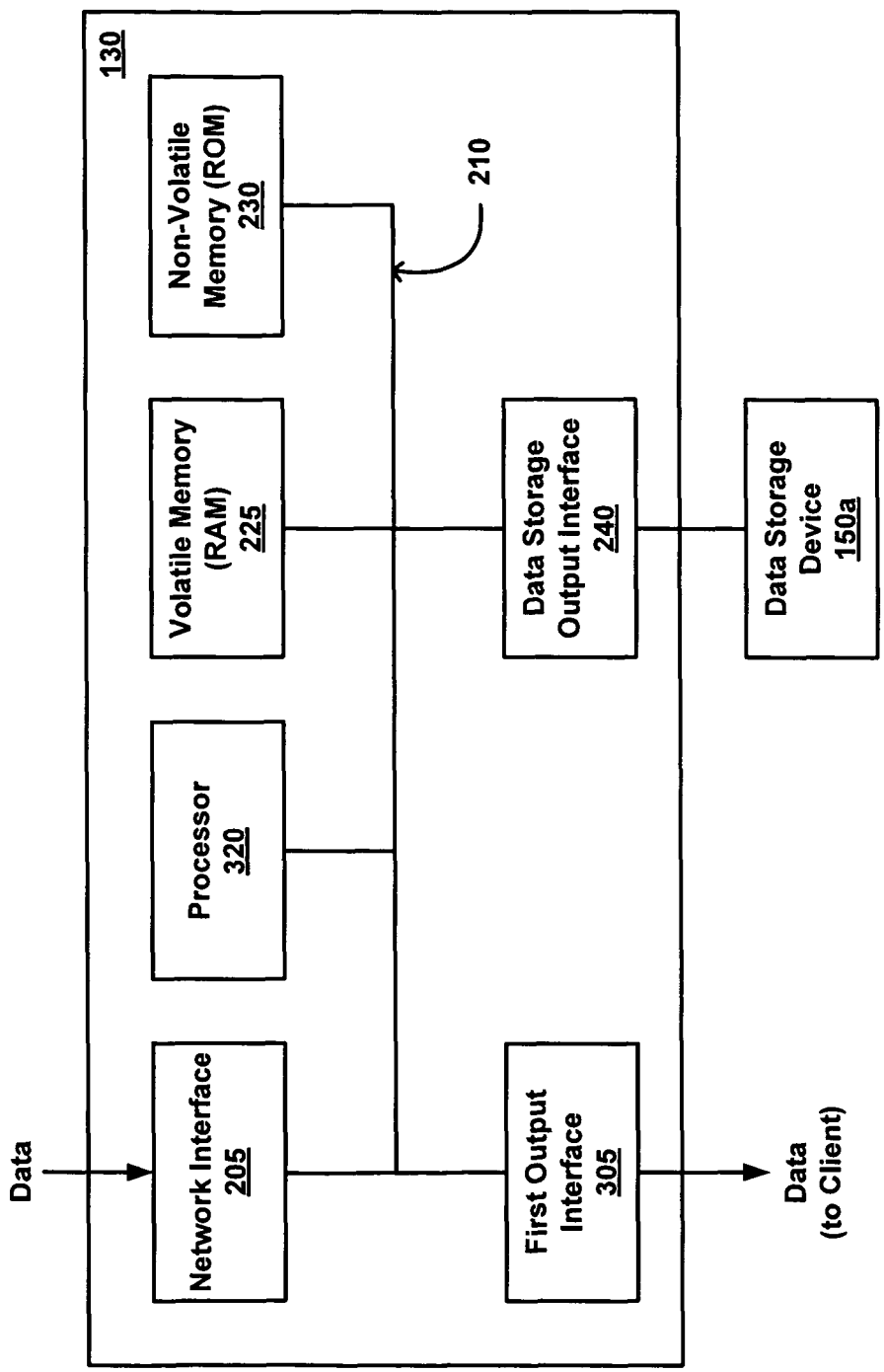
FIG. 3 is a block diagram illustrating a gateway device, in accordance with an embodiment of the present invention.

FIG. 3 is a block diagram illustrating a gateway device 130, in accordance with an embodiment of the present invention. It should be appreciated that gateway device 130 operates in a similar manner as client device 120. Gateway device 120 includes network interface 205, processor 320, volatile memory 225, non-volatile memory 230, first output interface 305, and data storage output interface 240 communicatively coupled over bus 210. Network interface 205, volatile memory 225, non-volatile memory 230, and data storage output interface 240 operate as described above in accordance with FIG. 2. It should be appreciated that gateway device 130 may include additional components that are not shown so as to not unnecessarily obscure aspects of the embodiments of the present invention.

It should be appreciated that bus 210 illustrates one example embodiment of the interconnections of the components of client device 120, and that different interconnections may be used. For example, the components can communicate over a single bus, can be communicatively coupled over separate connections, or any combination thereof.

Processor 320 is for processing information and instructions. In one embodiment, processor 320 is operable to execute a process for rendering and correcting data, e.g., process 400 of FIG. 4. In one embodiment, processor 320 is for controlling the transmission of received data to an output device through first output interface 305 for transmission to a client device, e.g., client device 120, for rendering. In one embodiment, low latency data is transmitted for rendering at an output device under the direction of client device 120, e.g., display device 132 and/or audio output device 134.

In one embodiment, gateway device 130 is operable to transmit low latency data to client device 120. Gateway device 130 is also operable to store data. In one embodiment, processor 320 is operable to determine defects in the data and is operable to correct the defects. In one embodiment, low latency data is received at network interface 205 and stored in volatile memory 225. Processor 320 controls the transmission of the data to first output interface 305 for transmission to a client device for rendering.

In one embodiment, processor 320 is also operable to determine defects within the data stored in non-volatile memory 225 and to take action for correcting the defects. In one embodiment, processor 320 identifies missing portions of the data. In one embodiment, processor 320 identifies damaged, e.g., corrupted, portions of the data. In one embodiment, processor 320 makes note of which portions of the data are likely to be damaged. For example, this can be done by checking for gaps in the sequence numbers of the received media, or by verifying error detection codes present in the received media.

In one embodiment, processor 320 is operable to request repair data from a source of the data, e.g., server 102 of FIG. 1, for correcting the defects. For example, where processor 320 identifies a missing portion of the data, processor 320 requests retransmission of the missing portion. In another example, where processor 320 identifies a damaged portion of the data, processor 320 requests retransmission of the damaged portion. In one embodiment, the request is transmitted through network interface 205 to the source, e.g., server 102, using RTCP. In another embodiment, the request is transmitted through network interface 205 to the source, e.g., server 102, using SRTCP. It should be appreciated that other protocols may be used for transmitting the request, and that the described embodiments are examples.

In one embodiment, at least a portion of the data is corrected after the data is transmitted to an output device for rendering. For example, to support low latency rendering, data transmitted for rendering may not be corrected for defects. After the data is transmitted for rendering, the data may remain in non-volatile memory 225 where processor 320 can control correction of the data. For instance, where processor 320 identifies a missing sequence number, processor 320 may request retransmission of the data associated with the missing sequence number before the received data is transmitted for rendering. However, the repair data including the data associated with the missing sequence number may not be received until after the data is transmitted for rendering. Processor 320 may then correct the data using the repair data. It should be appreciated that the corrected data including the repair data is available for higher latency rendering. In one embodiment, repair data includes parity information, if the original data is protected by an error correction code.

In one embodiment, the data is received at a first latency and the repair data is received at a second latency, wherein the first latency is lower than the second latency such that the data is for low latency rendering. The repair data is for correcting the data for storage.

In one embodiment, the corrected data is stored at an internal data storage device, e.g., non-volatile memory 230. In one embodiment, the corrected data is stored at an external data storage device, e.g., data storage device 150a. Processor 320 is operable to control the transmission of the corrected data to data storage device 150a through data storage output interface 240. In one embodiment, the corrected data is stored at an external data storage device connected over a network, e.g., data storage device 150c of FIG. 1. Processor 320 is operable to control the transmission of the corrected data to data storage device 150c through network interface 205.

Figure 4:
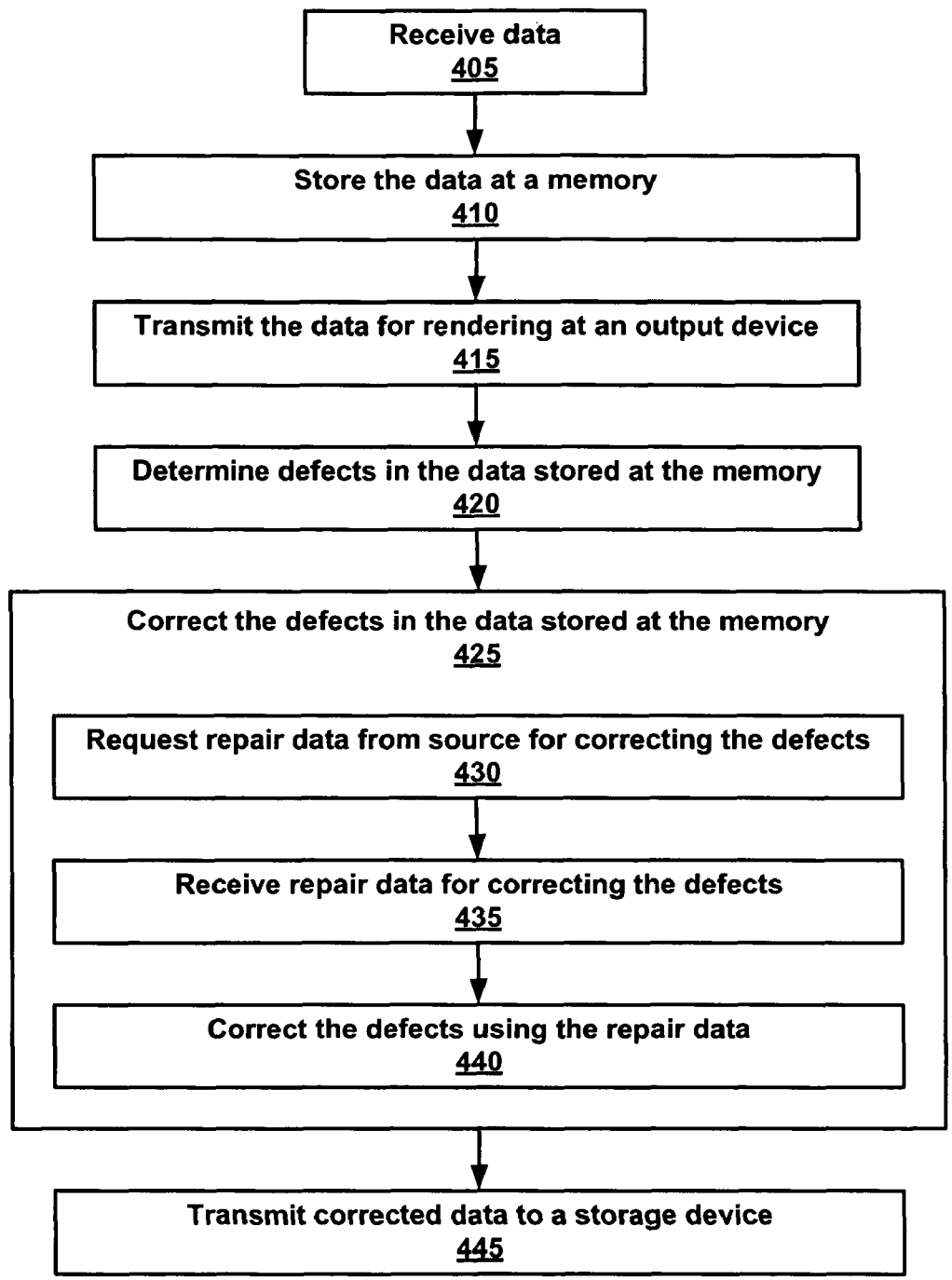
FIG. 4 is a flow chart illustrating a process for rendering and correcting data, in accordance with an embodiment of the present invention.

FIG. 4 is a flow chart illustrating a process 400 for rendering and correcting data, in accordance with an embodiment of the present invention. In one embodiment, process 400 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 400 is performed by client device 120 of FIG. 2. In one embodiment, process 400 is performed by gateway device 130 of FIG. 3.

At 405, data is received at an electronic device, e.g., client device 120 or gateway device 130. In one embodiment, the data is low latency data. In one embodiment, the data is media data.

At 410, the data is stored at a memory. In one embodiment, the data is stored in volatile memory, e.g., volatile memory 225. At 415, the data is transmitted for rendering at an output device. In one embodiment, where the data is received at a client device, the data is transmitted to an output device, e.g., display device 132 or audio output device 134, for rendering. In another embodiment, where the data is received at a gateway device, the data is transmitted to a client device for controlling the rendering of the data. It should be appreciated that 410 and 415 may be performed in any order, concurrently, simultaneously or consecutively.

At 420, defects in the data stored at the memory are determined. In one embodiment, missing portions of the data are identified. For example, data may be missing as a result of data delay or data loss. In another embodiment, damaged portions of the data are identified. For example, data may be corrupted during network communication.

At 425, the defects in the data stored at the memory are corrected. In one embodiment, least a portion of the correcting of the defects is performed after the data is transmitted at 415.

In one embodiment, as shown at 430, correcting the defects in the data includes requesting repair data from a source of the data for correcting said defects. In one embodiment, where missing data is identified at 420, retransmission of the missing portions is requested. In one embodiment, where damaged data is identified at 420, retransmission of the damaged portion is requested.

At 435, repair data is received for correcting the defects. In one embodiment, the repair data is received after the data is transmitted at 415. In one embodiment, the data is received at a first latency and the repair data is received at a second latency, wherein the first latency is lower than the second latency such that the data is for low latency rendering and the repair data is for correcting the data for storage.

At 440, the defects in the data stored at the memory are corrected using the repair data. In one embodiment, where the repair data is associated with missing data, the repair data is inserted into the data at the appropriate location, e.g., based on a sequence number. In one embodiment, where the repair data is associated with damaged data, the damaged data is replaced with the repair data.

In one embodiment, as shown at 445, the corrected data is stored at a storage device. In one embodiment, the corrected data is stored at an internal data storage device, e.g., non-volatile memory 230. In one embodiment, the corrected data is stored at an external data storage device, e.g., data storage device 150b for client device 120 of FIG. 2 or data storage device 150a for gateway device 130 of FIG. 3. In one embodiment, the corrected data is stored at an external data storage device connected over a network, e.g., data storage device 150a or data storage device 150c for client device 120 of FIG. 2 or data storage device 150c for gateway device 130 of FIG. 3.

In summary, embodiments of the present invention provide for the low latency rendering and correcting and storing the data. Embodiments of the present invention provide a method and device thereof for rendering low latency data and correcting and storing the low latency data. Embodiments of the present invention provide for correcting the data without requiring retransmission of all data. In various embodiments of the present invention, defects in the data are determined, and repair data associated with the defects is requested.

Various embodiments of the present invention, a rendering and correcting data, are described herein. While the present invention has been described in particular embodiments, it should be appreciated that the present invention should not be construed as limited by such embodiments, but rather construed according to the following claims.

What is claimed is:

1. A method for rendering and correcting data, said method comprising:

receiving data, wherein said data comprises audio and video;

storing said data at a memory;

transmitting said data for rendering at an output device;
determining defects in said data stored at said memory;
receiving repair data for correcting said defects;
correcting said defects in said data stored at said memory using said repair data, wherein at least a portion of said correcting said defects is performed after said transmitting said data; and
wherein said data is received at a first latency and said repair data is received at a second latency, wherein said first latency is lower than said second latency such that said data is for low latency rendering and said repair data is for correcting said data for storage.

2. The method as recited in claim 1 wherein said correcting said defects in said data stored at said memory comprises requesting repair data from a source of said data for correcting said defects.

3. The method as recited in claim 2 wherein said determining defects in said data stored at said memory comprises identifying missing portions of said data and wherein said requesting repair data from a source of said data comprises requesting retransmission of said missing portions of said data.

4. The method as recited in claim 2 wherein said determining defects in said data stored at said memory comprises identifying damaged portions of said data and wherein said requesting repair data from a source of said data comprises requesting retransmission of said damaged portions of said data.

5. The method as recited in claim 1 further comprising storing corrected data at a storage device.

6. An electronic device comprising:
a network interface for receiving data and repair data over a network, wherein said data comprises audio and video;
a first output interface for transmitting said data to an output device for rendering;
a first memory for storing said data;
a processor for determining defects in said data stored in said first memory and for correcting said defects in said data stored in said first memory, wherein at least a portion of said data is corrected after said data is transmitted to said output device for rendering; and
wherein said data is received at a first latency and said repair data is received at a second latency, wherein said first latency is lower than said second latency such that said data is for low latency rendering and said repair data is for correcting said data for storage.

7. The electronic device as recited in claim 6 wherein said processor is for requesting repair data from a source of said data for correcting said defects.

8. The electronic device as recited in claim 7 wherein said processor is for identifying missing portions of said data and for requesting retransmission of said missing portions of said data.

9. The electronic device as recited in claim 7 wherein said processor is for identifying damaged portions of said data and for requesting retransmission of said damaged portions of said data.

10. The electronic device as recited in claim 7 wherein said network interface is for receiving repair data for correcting said defects and said processor is for correcting said defects in said data stored at said memory using said repair data after said data is transmitted to said output device for rendering.

11. The electronic device as recited in claim 6 further comprising a second memory for storing corrected data, wherein said first memory comprises a volatile memory unit and said second memory comprises a non-volatile memory unit.

12. The electronic device as recited in claim 6 further comprising a second output interface for transmitting said data to a storage device.

13. One or more computing device readable media for storing instructions that when executed by one or more processors perform a process comprising:
receiving data at a first latency, wherein said data comprises audio and video;
storing said data at a memory;
transmitting said data for rendering at an output device;
determining defects in said data stored at said memory;
requesting repair data from a source of said data for correcting said defects;
after said transmitting said data, receiving repair data for correcting said defects at a second latency, wherein said second latency is higher than said first latency; and
correcting said defects in said data stored at said memory using said repair data.

14. The one or more computing device readable media as recited in claim 13, wherein said determining defects in said data stored at said memory comprises identifying missing portions of said data and wherein said requesting repair data from a source of said data comprises requesting retransmission of said missing portions of said data.

15. The one or more computing device readable media as recited in claim 13, wherein said determining defects in said data stored at said memory comprises identifying damaged portions of said data and wherein said requesting repair data from a source of said data comprises requesting retransmission of said damaged portions of said data.

* * * * *